(12) United States Patent
Matthews et al.

(10) Patent No.: US 7,320,345 B2
(45) Date of Patent: Jan. 22, 2008

(54) TIRE SAFETY VALVE AND INFLATION DEVICE

(76) Inventors: Tim Matthews, P.O. Box 210, Krum, TX (US) 76249; Joshua A. Matthews, P.O. Box 210, Krum, TX (US) 76249; Howard Ashcraft, 503 Chapman Dr., Sanger, TX (US) 76266

( * ) Notice: Subject to any disclaimer, the term of this patent is extended or adjusted under 35 U.S.C. 154(b) by 157 days.

(21) Appl. No.: 11/267,857

(22) Filed: Nov. 7, 2005

(65) Prior Publication Data
US 2007/0113916 A1    May 24, 2007

(51) Int. Cl.
*B65B 31/00* (2006.01)
(52) U.S. Cl. .................. 141/38; 141/40; 141/83; 141/96; 137/224; 137/227
(58) Field of Classification Search .......... 141/10, 141/38–41, 67, 83, 94–96, 114; 137/223–231
See application file for complete search history.

(56) References Cited

U.S. PATENT DOCUMENTS

| | | | | | |
|---|---|---|---|---|---|
| 1,765,850 | A | * | 6/1930 | Richardson | 137/524 |
| 2,015,882 | A | * | 10/1935 | Brewer | 137/224 |
| 2,173,369 | A | * | 9/1939 | McElroy | 137/224 |
| 2,501,801 | A | * | 3/1950 | Wallin | 137/224 |
| 2,933,098 | A | * | 4/1960 | Lisiak | 137/224 |
| 3,074,457 | A | * | 1/1963 | Tubbs | 152/427 |
| 3,200,831 | A | * | 8/1965 | Whitfield | 137/102 |
| 3,720,224 | A | * | 3/1973 | Foxhall | 137/227 |
| 4,120,614 | A | * | 10/1978 | Bouder | 417/63 |
| 4,660,590 | A | * | 4/1987 | Sanchez | 137/226 |

\* cited by examiner

*Primary Examiner*—Timothy L. Maust
(74) *Attorney, Agent, or Firm*—John E. Vandigriff

(57) ABSTRACT

An air inflation device is a pass-thru vehicle tire inflation device. It ensures exact air pressure without the use of an air gauge. It works by attaching to a tire valve, and then to an existing air supply, such as those found at gas stations, and utilizing an internal pressure relief valve that is pre-set to exact PSI recommendations. This means that the inflation device will put only the amount of air needed in every tire without having to use a pressure gauge. Air moves through an internal air chamber constructed of plastic or rubber tubes that runs through the nozzle to the head that attaches to the valve of the tire. A plastic valve located on the back of the apparatus connects to any existing air supply. A pressure relief valve is integrated into the bottom of the nozzle that ensures that the exact PSI recommendations are maintained.

14 Claims, 4 Drawing Sheets

TIRE SAFETY VALVE AND INFLATION DEVICE

FIELD OF THE INVENTION

The invention relates to a tire pressure safety valve and air inflation device, and more particularly to a device for allowing a tire to be inflated to a predetermine air pressure, or to correct an over inflated tire.

BACKGROUND OF THE INVENTION

Tire inflation devices are usually connected to a hose from an air source, and then is pressed against a tire valve allowing air to enter into the tire. The person inflating the tire may have to remove the inflation device and use an air gage to determine the amount of air in the tire based upon the air pressure in the tire. This may have to be done several times to inflate the tire to the desired pressure. If the tire is over inflated, then air has to be removed.

An air regulation device is disclosed in U.S. Pat. No. 5,628,350. Disclosed is a tire inflation device for delivering a fluid, such as carbon dioxide, from a liquid gas cartridge to a pneumatic tire wherein the device has a capability of controlling inflation to enable the user to achieve a preset desired tire pressure. A cartridge activating mechanism is provided. A cartridge securing mechanism is provided which prevents removal of an activated, unspent cartridge from the inflating device.

SUMMARY OF THE INVENTION

The air inflation device is a pass-thru vehicle tire inflation device. It is unique in that it ensures exact air pressure without the use of an air gauge. It works by attaching to a tire valve and an existing air supply, such as those found at gas stations, and utilizing an internal pressure relief valve that is pre-set to exact PSI recommendations. Ultimately this means that the inflation device will put only the amount of air needed in every tire without having to use a pressure gauge or even worse, guess.

The air inflation device may be made of injection molded plastic, or metal, and has rubber or plastic air tubes. The air is moved through an internal air chamber that is constructed of plastic or rubber tubes that runs through the nozzle to the head that attaches to the valve of the tire. A plastic inlet is located on the back of the apparatus that will connect to any existing air supply. A pressure relief valve is integrated into the bottom of the nozzle that ensures that the exact PSI recommendations are maintained.

The air flow device is connected first to a tire first and then to an existing air supply. It is then place against the tire valve and when the correct PSI in the tire is obtained, the airflow is automatically terminated, and a visual alert pops out preventing the over filing of the tire.

The technical advance represented by the invention as well as the objects thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
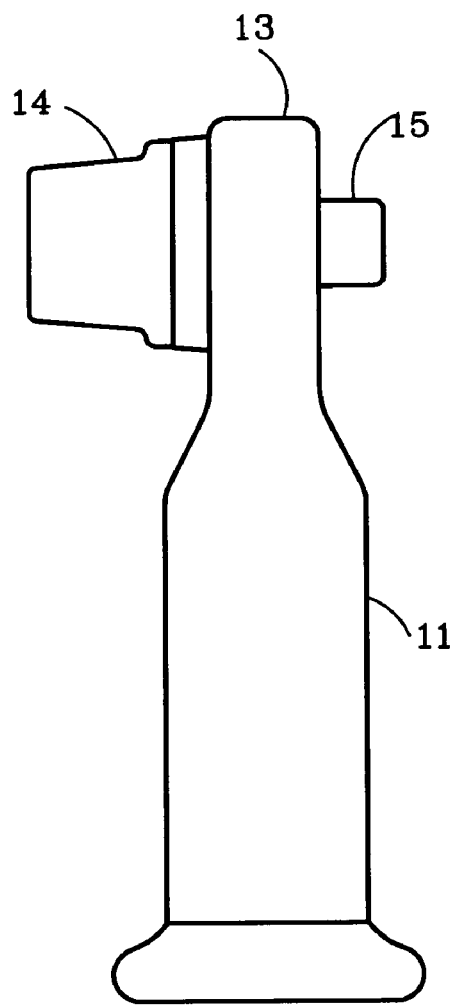
FIG. 1 is a side view of an inflation device.

FIG. 1 is a side view of the inflation device 10. Device 10 has a handle or grasping section 11, with and end part 30. Air is injected into inlet 15 on end 13, and outlet 14 is placed over a valve stem for inflating, for example, a tire.

Figure 2:
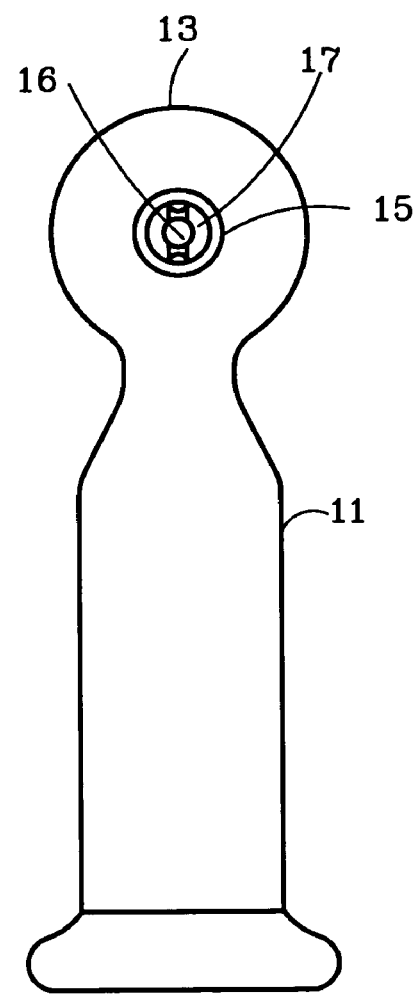
FIG. 2 is a first end view of an inflation device.

FIG. 2 is an end view showing the right side of inflation device 10 as illustrated in FIG. 1. This side is used for connection to an air source, such as an air hose. The hose nozzle (not illustrated) is placed against inlet 15 and against actuator 16 which presses against the air release valve in the air hose. When air is released, air flow into channel 17.

Figure 3:
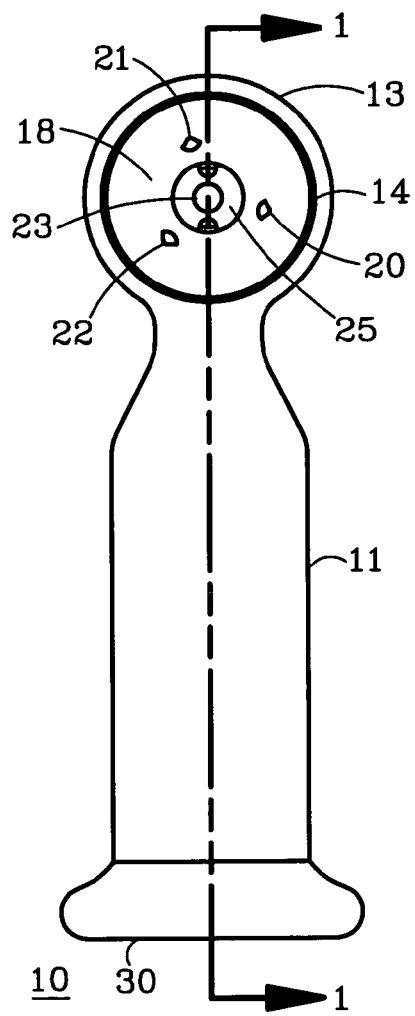
FIG. 3 is a second end view of an inflation device.

FIG. 3 is an end view, viewed from the left side of FIG. 1. Inflation device 10, with handle 11, has the air outlet side 14 which is placed over a valve stem (not illustrated) with the end of the valve stem inserted into opening 18 which tapers inward to valve stem actuator 23. There are several raised ridges 20-22 which, when a valve stem is inserted into opening 18, holds the valve stem and the inflation device in frictional contact. Air passage 25 allows air to flow though from the opposite side of end 13, from air passage 17.

Figure 4:
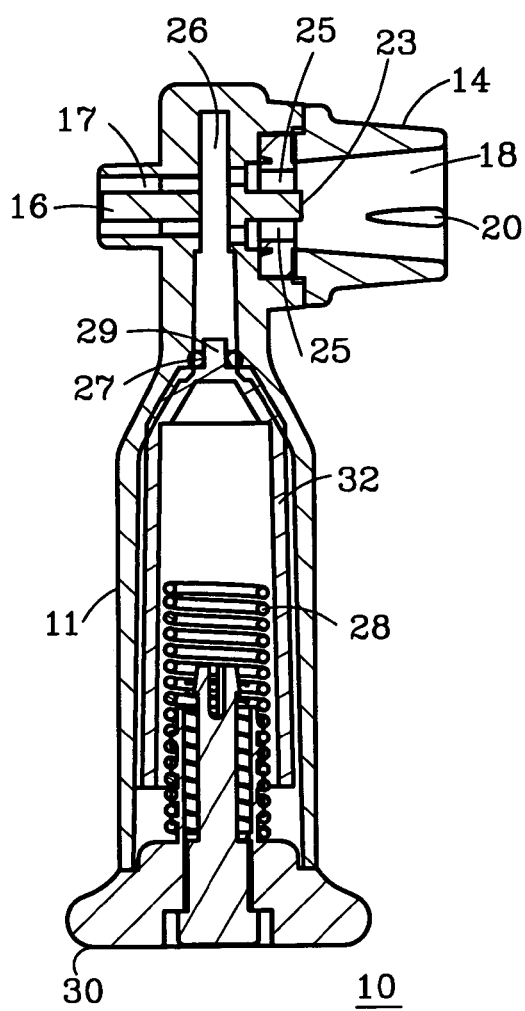
FIG. 4 is a cross sectional view of an inflation device.

FIG. 4 is a cross-sectional view of the air inflation device 10, taken through 1-1 of FIG. 3. Mounted on the left side, as viewed, of end 13 is actuator 16 against which is pressed an air hose to release air into air passage 17. Air flows from passage 17 into area 26 and through end 13 to air passage 25, moving air in to a valve stem (FIG. 5) placed in opening 18. The air in opening 26 presses downward against valve 29. Pressure relief valve 29 is held in a closed position by spring 28. Air is contained in area 26 by valve 29 and ring 27 until the air in area 26 exceeds the calibrated upward pressure asserted by spring 28. When the air pressure in area 26 exceeds the calibrated upward pressure of spring 28, then pressure relief valve 29 will move downward allowing air to flow through valve 29 into air passage 31 around spring housing 32, and inside handle 11.

Figure 5:
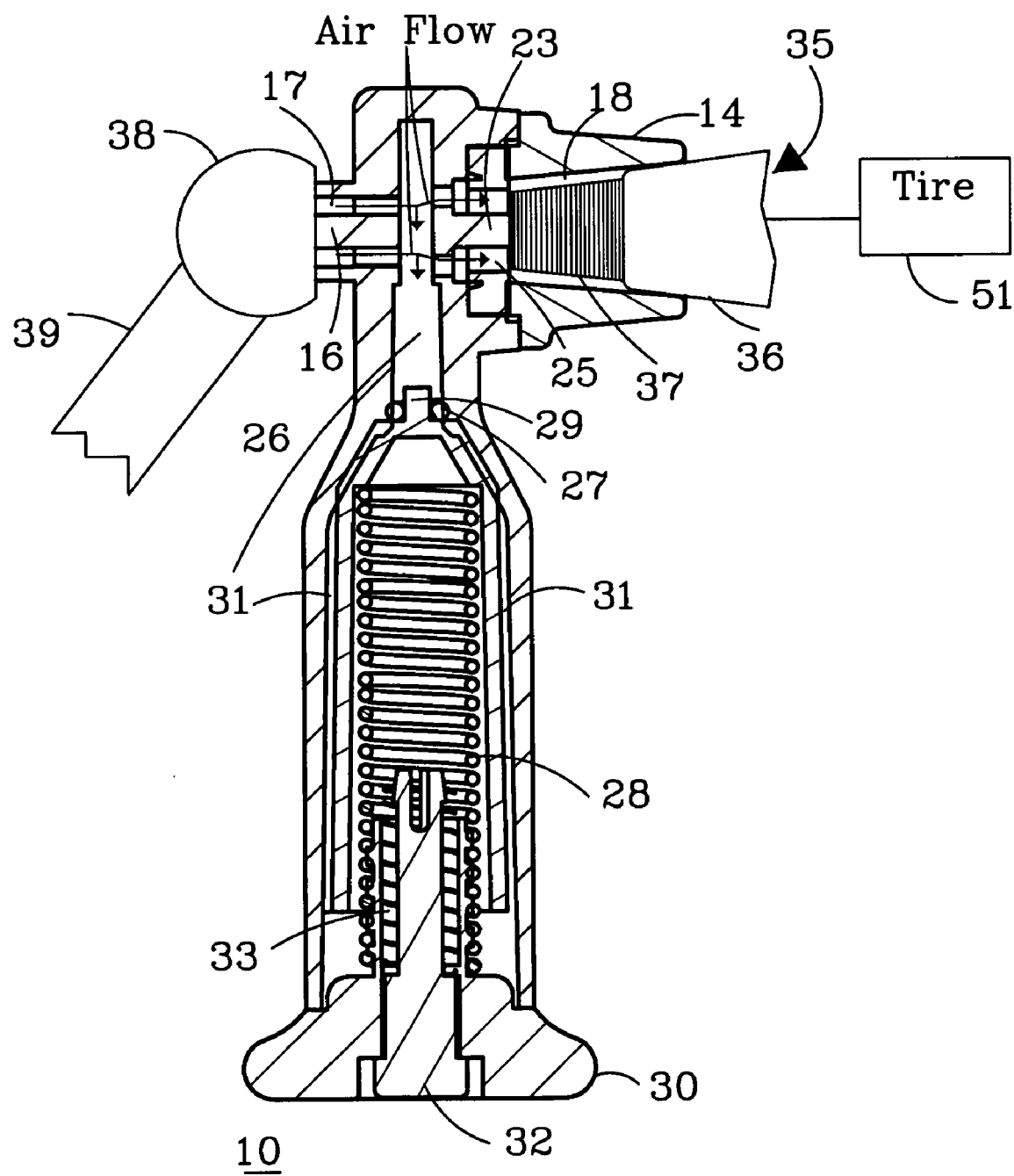
FIG. 5 shows the inflation device in use with a tire stem.

FIG. 5 is a cross-sectional view of air inflation device 10 showing it attached to a tire valve 35 and an air hose 39. When a tire, or device to be inflated, requires air, air inflation device is attached to the air valve stem 35. The end of the stem 37 is inserted into opening 18 and move forward until the valve stem is in contact with valve stem actuator 23. The inner surface of opening 18 has one or more ridges 20-22 (FIG. 3) that engage part 36 of valve stem 35. On automobile tires, part 36 of the valve stem is usually a rubber or plastic composition so that when valve stem 35 is place into opening 18, the rubber portion will frictionally engage the ridges 20-22, holding the air inflation device 10 and valve 35 together.

Valve 38, which is attached to air hose 39, is pressed against air inlet 15, and against actuator 16 releasing air into air passage 17. Air flows through passage 17, into area 26 and through to air passage 25 allowing air to flow into stem 36, inflating a tire attached to stem 36.

Spring 28 is calibrated to be actuated when the air area 26 is at a predefined pressure. For example, tires are usually inflated to a pressure in the range of, for example, 20 to 125 psi. As long as the device being inflated has not been inflated to a predefined pressure, air will continue to flow from air hose 39 through air passage 17, into area 26 and through air passage 25 into valve stem 35 and into tire 51. When the air pressure in tire 51 reaches the predetermine value, the air pressure in area 26 will be the predetermined pressure and will force pressure relief valve 29 downward, allowing air to flow downward into air passage 31. As long as the air pressure in tire 51 is at the predetermined value, valve 29 will remain open, preventing further air flow into valve 35 and tire 51. The air flow is shown by the arrows marked "Air Flow". The air path from the air source is directly across the end 13 into the air valve 35 and tire 51. The second path, as illustrated, is downward though valve 29 when the predetermined pressure is reached. A visual alert indicator 32 is pushed downward indicating the predetermined air pressure has been reached.

The predetermined air pressure is determined by spring 28 which is calibrated to be compressed at the predetermined air pressure. In this manner, tire can be inflated only to the predetermined air pressure. A tire pressure gage does not have to be used. The person inflating the tire applies air to the inflation device which automatically prevents air from entering tire 51 after the predetermined pressure been reached.

Figure 6:
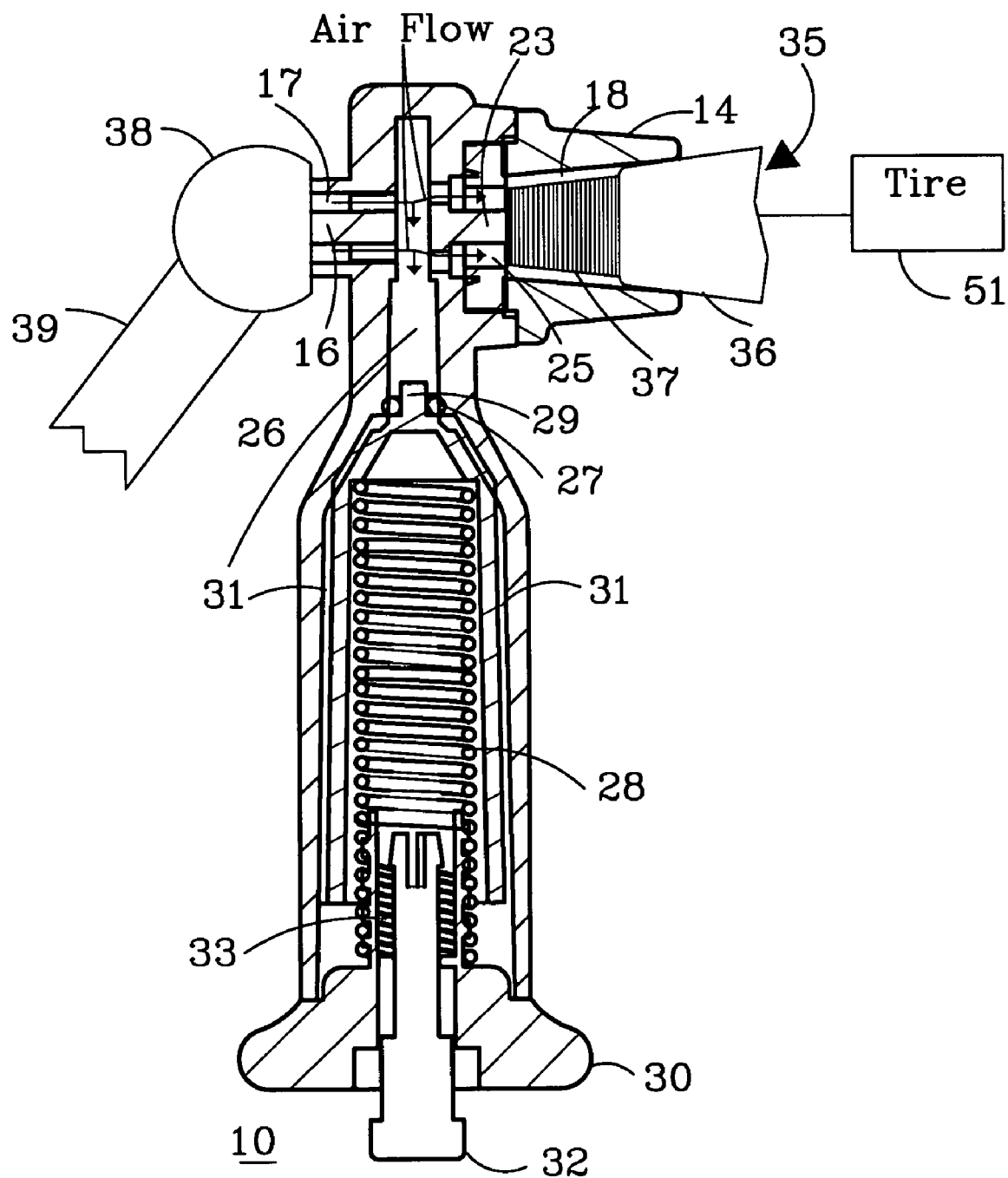
FIG. 6 show an actuated pop out valve.

FIG. 6 shows the visual alert indicator 32 in the downward position. When the tire pressure reaches the predetermined value, valve 29 opens allowing air to enter the channel 31. This allows the escaping air to push downward on indicator 32 forcing it downward and compressing spring 33. When the pressure is removed by the closing of valve 29, indicator 32 will return to its closed position as shown in FIG. 5. Indicator is closed by spring 33 which was compressed when indicator 32 was forced open (or downward) by the air release into channel 31 by valve 29

What is claimed is:

1. A tire safety valve and air inflation device used to inflate a device to a predetermined pressure; comprising:
   a handle;
   an inlet on a first end of said handle for introducing air in to the air inflation device;
   an outlet for directing air from the air inflation device to a device to be inflated, said outlet being adjacent to said inlet, and connected thereto by a first air channel;
   a pressure relief valve and a second air channel, said second channel connected to said first air channel, and the first air channel connects the inlet to the outlet without obstruction;
   wherein when the pressure in said second channel is of a predetermine value, the pressure relief valve will open preventing addition air from entering the device to be inflated.

2. The air inflation device according to claim 1, wherein the pressure relief valve includes a spring calibrated to hold the pressure valve closed until a predefined pressure is attained in the device being inflated.

3. The air inflation device according to claim 1, wherein said first air channel and second air channel are perpendicular to each other.

4. The air inflation device according to claim 2, wherein said pressure relief valve and spring extend downward in the inflation device handle.

5. The air inflation device according to claim 1, wherein said outlet for directing air into a device to be inflated includes at least one protrusion for frictionally holding an air inlet valve on the device to be inflated.

6. The air inflation device according to claim 1, including air relief channel extending downward into the handle of the air inflation device.

7. The air inflation device according to claim 1, including a visual alert device, indicating when the device to be inflated has been inflated to the desire pressure.

8. An air inflation device used in inflating a device to a predetermined pressure; comprising:
   a handle;
   an inlet on a first end of said handle for introducing air in to the air inflation device;
   an outlet for directing air from the air inflation device to a device to be inflated, said outlet being adjacent to said inlet, and connected thereto by a first air channel;
   a pressure relief valve and a second air channel, said second channel connected to said first air channel and extending into said handle, and the first air channel connects the inlet to the outlet without obstruction;
   wherein when the pressure in said second channel is of a predetermine value, the pressure relief valve will open preventing addition air from entering the device to be inflated.

9. The air inflation device according to claim 8, wherein the pressure relief valve includes a spring calibrated to hold the pressure valve closed until a predefined pressure is attained in the device being inflated.

10. The air inflation device according to claim 8, wherein said first air channel and second air channel are perpendicular to each other.

11. The air inflation device according to claim 9, wherein said pressure relief valve and spring extend downward in the inflation device handle.

12. The air inflation device according to claim 8, wherein said outlet for directing air into a device to be inflated includes at least one protrusion for frictionally holding an air inlet valve on the device to be inflated.

13. The air inflation device according to claim 8, including a visual alert device, indicating when the device to be inflated has been inflated to the desire pressure.

14. An air inflation device used in inflating a device to a predetermined pressure; comprising:
   a handle;
   an inlet on a first end of said handle for introducing air in to the air inflation device;
   an outlet for directing air from the air inflation device to a device to be inflated, said outlet being adjacent to said inlet, and connected thereto by a first air channel;
   a pressure relief valve and a second air channel, said second channel connected to said first air channel and extending into said handle, and the first air channel connects the inlet to the outlet without obstruction; and
   a visual alert indicator indicating when the device has been inflated to the desired pressure;
   wherein when the pressure in said second channel is of a predetermine value, the pressure relief valve will open reducing the air pressure in the outlet, preventing addition air from entering the device to be inflated.

* * * * *